United States Patent [19]
Easwar et al.

[11] Patent Number: 6,101,290
[45] Date of Patent: Aug. 8, 2000

[54] BANDWIDTH EFFICIENT IMAGE TRANSFORMATIONS ON A MULTIPROCESSOR

[75] Inventors: Venkat V. Easwar, Campbell, Calif.; Srinivasan Ramachandran; Pochiraju Srinivas Rao, both of Karnataka, India

[73] Assignee: Texas Instruments Incorporated, Dallas, Tex.

[21] Appl. No.: 08/957,521

[22] Filed: Oct. 24, 1997

[51] Int. Cl.[7] .................................................. G06K 9/32
[52] U.S. Cl. ........................ 382/293; 382/297; 382/307
[58] Field of Search .................................. 382/293, 295, 382/296, 297, 298, 307; 345/427, 431, 438, 439; 395/116

[56] References Cited

U.S. PATENT DOCUMENTS

| | | | |
|---|---|---|---|
| 5,029,225 | 7/1991 | Ueda | 382/295 |
| 5,452,374 | 9/1995 | Cullen et al. | 382/296 |
| 5,509,115 | 4/1996 | Butterfield et al. | 395/116 |
| 5,598,181 | 1/1997 | Kermisch | 345/126 |
| 5,644,659 | 7/1997 | Honda | 382/297 |

*Primary Examiner*—Yon J. Couso
*Attorney, Agent, or Firm*—Charles A. Brill; Wade James Brady, III; Frederick J. Telecky, Jr.

[57] ABSTRACT

A method of efficiently transferring data during image transformations performed by a multiprocessor (10). A bounding box (35) is defined for source data to be transferred to the multiprocessor (10) for processing. The dimensions of the bounding box (35) are derived from the dimensions of an associated block (30) in destination space and from the transform coefficients. The bounding box dimensions may be calculated so as to provide the most efficient transfers.

17 Claims, 5 Drawing Sheets

EXECUTION TIMES (S)

| | SPARC-10 | MP | SCAN-LINE BASED APPROACH | | | BLOCK-BASED APPROACH | | |
|---|---|---|---|---|---|---|---|---|
| | | | 1PP | 2PPs | 4PPs | 1PP | 2PPs | 4PPs |
| 90° ROTATION 2:1 SCALING | 2.66 | 2.12 | 0.078 | 0.049 | 0.048 | 0.042 | 0.022 | 0.014 |
| 45° ROTATION 2:1 SCALING | 2.45 | 2.04 | 0.08 | 0.05 | 0.049 | 0.08 | 0.042 | 0.027 |

(∗) — SOURCE COORDINATE VALUES
$G_X$ — GRAY VALUE CORRESPONDING TO SOURCE PIXEL X

BANDWIDTH EFFICIENT IMAGE TRANSFORMATIONS ON A MULTIPROCESSOR

TECHNICAL FIELD OF THE INVENTION

This invention relates generally to processing image data with a multiprocessor system, and more particularly to a method of performing image transformations such that the bandwidth of data transfers to the multiprocessor system is minimized.

BACKGROUND OF THE INVENTION

Image data processing, whether for printing or display applications, involves the conversion of display list instructions to bit-mapped data. The display list that is rasterized may be the result of interpretation of higher level instructions, such as those provided by a page description language. The conversion process is often referred to as "raster image processing". The process is also referred to as "scan conversion", even when the display device is other than a cathode ray tube.

The raster image processing may be performed with a multiprocessor system, where multiple processors share raster image processing tasks. On many multiprocessor systems, bandwidth is critical because a single bus must serve a number of processors.

Certain image data processing tasks have been implemented with algorithms that are efficient with respect to computational speed, but not with respect to bandwidth efficiency. One such processing task is image transformation. Image transformation includes operations such as rotation, translation, scaling, and shearing of images. Given a source region and a destination region, the objective is to map an image in the source region to its transform in the destination region.

An image transformation is performed in two steps. The first step is the "interpretation" step. First, the outline of the transformed image in the destination space is clipped to the current clip path. Then, the clipped outline is reduced to trapezoids and run-arrays. The second step is the "rasterization" step. Once the trapezoids are defined in destination space, each pixel in the trapezoid must correspond to a pixel in the source image. Pixel values in the destination space are calculated with a mathematical transformation algorithm.

Conventionally, the rasterization step of transformation is performed one line of a trapezoid at a time. Data caches have been used to assist in providing real time transformations, but conventional data cache methods are implemented on a scan-line basis, which limits their usefulness. For example, a conventional data cache might receive a line of the source image. In the case of a transformation where the image is to be rotated 45 degrees, each pixel in the source space maps to a different line in the destination space. Thus, a new line must be cached to generate each new pixel in the destination space.

SUMMARY OF THE INVENTION

One aspect of the invention is a method of caching source image data, which is to be transformed in accordance with transform coefficients by a multiprocessor system having a cache memory. A destination block, which is to contain transformed image data in destination space, is defined by calculating its width and height. These destination block dimensions are calculated by first selecting a value for the destination block width, then using this value to calculate the destination block height from the size of the cache memory and the transformation coefficients. A bounding box, which contains the source data for the transformed image data in the destination block, is defined by calculating a bounding box width and height. These bounding box dimensions are derived from the destination block dimensions and the transform coefficients. The data in the bounding box is the data to be transferred to the cache. The bounding box dimensions can be optimized for the most efficient transfers by use of a transfer cycles value, whose minimum value is a function of the destination block dimensions.

An advantage of the invention is that image transformations with multiprocessor systems are more efficiently performed. Bottlenecks in transferring data to and from the multiprocessor are reduced and processor utilization is improved.

DETAILED DESCRIPTION OF THE INVENTION

Image Transformations Using a Multiprocessor System

One aspect of the invention is a method of reducing bandwidth of data transfers during image transformations. For each two dimensional block in the destination region, an associated rectangular "bounding box" in the source region is defined and cached. In effect, the caching method takes advantage of the two-dimensional nature of the image. Optimal sizes for these bounding boxes can be determined. Other aspects of the invention are directed to providing further efficiency for special types of transformations.

The description here is in terms of printing applications. However, the same concepts could be used for display applications.

The invention is useful with any multiprocessor system, that is, a system where multiple processors share raster image processing tasks and use a common bus, operating concurrently and not necessarily on the same task at once. A multiprocessor system, as that term is used herein, may be a system of processors on a single integrated circuit ("chip")

or the processors may be simply be connected by some sort of data bus. The performance of a multiprocessor system, particularly one that uses a single bus for data transfers on and off the chip, is a function of bandwidth efficiency as well as computational speed. Also, the invention is directed to multiprocessor system having software managed data cache memory.

An example of a multiprocessor system with which the invention is useful is a Multimedia Video Processor (MVP), such as the TMS320C80, manufactured by Texas Instruments Incorporated. As explained below, the MVP is a single chip multiprocessor system, having a master processor and a number of subprocessors. However, the same concepts apply to any multiprocessor system as that term is defined in the preceding paragraph.

Figure 1:
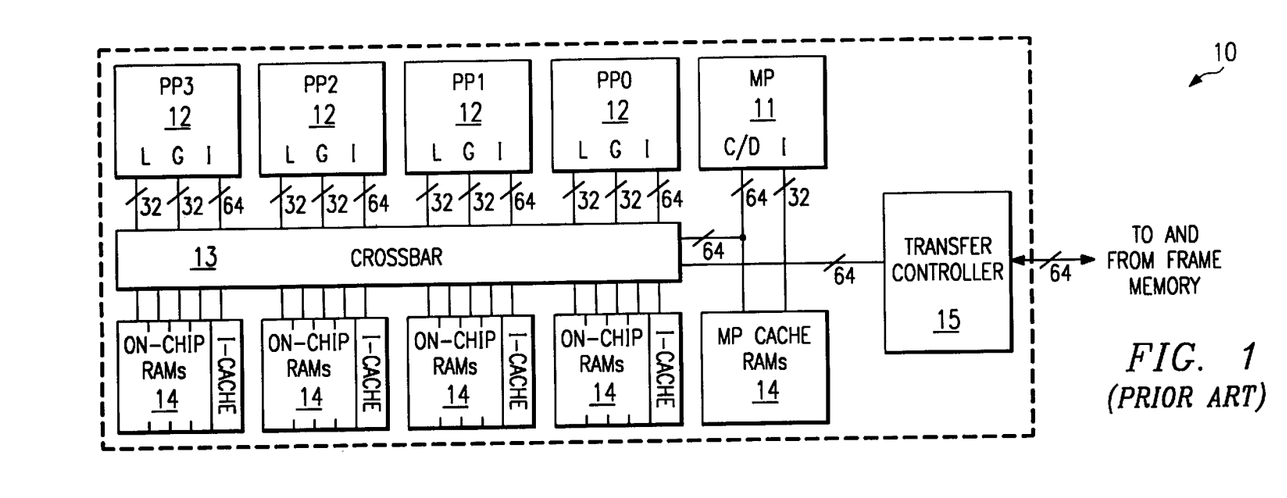
FIG. 1 illustrates a multiprocessor system, which may be programmed to perform image transformations in accordance with the invention.

FIG. 1 illustrates an MVP multiprocessor 10, which may be programmed to perform image transformations in accordance with the invention. Multiprocessor 10 is a multiple instruction, multiple data (MIMD) processor, which combines a RISC-based master processor 11 and four parallel processors 12 on the same chip. The parallel processors 12 are hybrid graphics and signal processors, and are capable of performing a multiply, an ALU operation, and a load and store in a single cycle. A cross-bar network 13 connects processors 11 and 12 to 50 Kbytes of on-chip RAM. This 50 Kbytes of RAM is divided into 25 different 2K RAMs 14, such that each parallel processor 12 has three associated data RAMs 14, a parameter RAM 14, and an instruction cache RAM 14. The data RAMs 14 and the parameter RAM 14 of a parallel processor 12 can be accessed by any other processor 11 or 12. This provides 32 Kbytes of on-chip shared memory. When more than one access is requested of a single RAM 14, round-robin prioritization hardware permits one parallel processor 12 to access the RAM 14 while the other contending parallel processors 12 are stalled and serviced in subsequent cycles.

The processors 11 and 12 are connected to external devices by means of a transfer controller 15. The transfer controller 15 is a combined direct memory access controller and a memory interface that queues, prioritizes, and services data requests and cache misses of the master processor 11 and the parallel processors 12. For purposes of this description, transfer controller 15 transfers source image data on-chip from external frame memory, and after the source image data is used to generate destination image data, it transfers the destination image data out to external frame memory.

Data transfers are requested by the parallel processors 12 in the form of linked list packet transfer requests. Two types of transfers are possible: dimensioned and guided transfers. Dimensioned transfers allow regularly spaced blocks of data to be transferred. Guided transfers are more versatile, in that on-chip memory tables, called guide tables, can be set up to specify starting address locations and dimensions of randomly distributed patches in a tabular form. The guide tables are then used by the transfer controller 15 to guide it in moving the appropriate patches between external memory and on-chip RAMs 14. For image transformations, the parallel processors 12 set up guide tables and request transfer controller 15 for input/output data transfers required for the transformation.

For purposes of example in this description, the image transformations are assumed to be affine transformations, such as those supported by page description languages. The source image is defined in a source space, uv, and is transformed to a device (destination) space, xy, using the following affine transformation:

$$u = ax + cy + t_x$$
$$v = bx + dy + t_y.$$

As stated in the Background, the interpretation step of an image transformation begins with transforming the outline of the image in the source space to the transformed image's outline in the destination space. This outline is then clipped to the destination space boundary. The resulting clipped outline is segmented into trapezoids.

In the embodiment of this description, the image is also banded to facilitate parallel processing. That is, the destination space is divided into multiple horizontal bands that span the width of the frame or page. The trapezoids into which the image has been decomposed, are "bucketized" into different bands. This includes clipping the trapezoids to the bands, thereby generating new trapezoids. The banding of images is further described in U.S. patent application Ser. No. 60/030,423, entitled "Parallel Raster Image Processing", assigned to Texas Instruments Incorporated and incorporated herein by reference.

Typically, the master processor 11 performs the interpretation phase of scan conversion. However, interpretation tasks may also be distributed to the parallel processors 12.

The outputs of the interpretation, that is, the inputs to the rasterization performed by the parallel processors 12, include the source image data, the associated transform parameters $(a,b,c,d,t_x,t_y)$, and a geometrical description of the trapezoids that are to be filled with the transformed source image data.

For rasterization, the four parallel processors 12 are initially assigned to the first four bands. They rasterize each band by requesting source data from external memory and caching this data in RAMs 14. The first parallel processor 12 that finishes rasterizing its trapezoid list is assigned to the next band, the next parallel processor 12 that finishes is assigned to a next band, and so on, in a dynamic scheduling mode.

The transfer controller 15, which is the only interface to external devices, can become a bottleneck if the rasterizing process is not properly implemented. As explained below, one way to reduce bottlenecks is to transfer blocks of image data to and from the parallel processors 12 rather than transfer scan lines.

Bounding Box Data Caching

Figure 2:
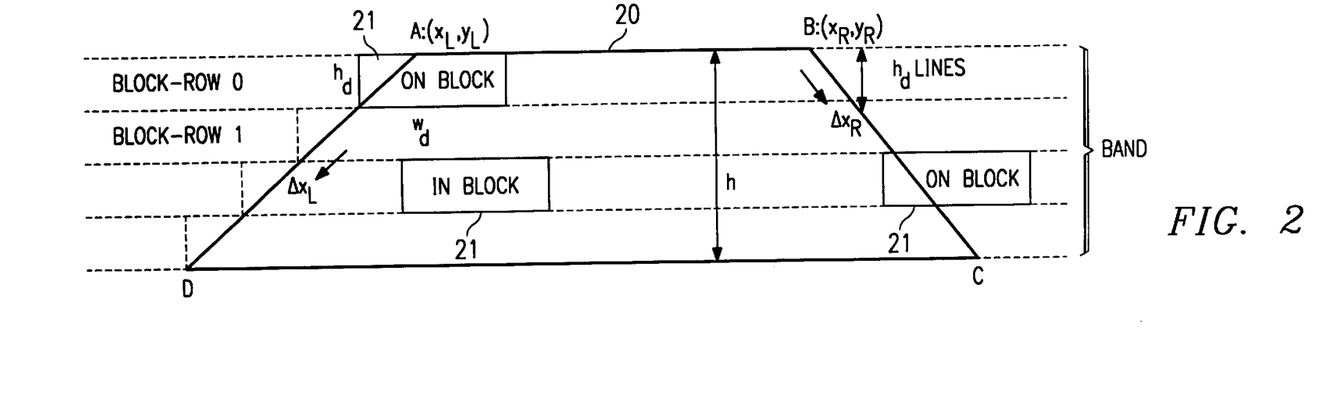
FIG. 2 illustrates a portion of an image in destination space, reduced to a trapezoid and divided into block rows during the interpretation step of the transformation.

FIG. 2 illustrates how trapezoids are divided into destination blocks 21 for block-based caching on multiprocessor 10 in accordance with the invention. The trapezoid 20 of FIG. 2 is in destination space and represents one of the trapezoids created by the above-described banding process. Each of the trapezoids is divided in the same manner as described for trapezoid 20.

First, the trapezoid 20 is logically divided into block-rows. A block-row is a row of destination blocks 21 of size $W_D \times h_D$. The destination blocks 21 are classified as IN-blocks or ON-blocks. IN-blocks are those that fall wholly within the trapezoid 20. ON-blocks are those that are on boundaries of the trapezoid 20.

A parallel processor 12 scan converts the trapezoid 20 one block-row at a time, and scan converts each block-row one block at a time. For each block-row, the parallel processor 12 creates a span table for the block-row. The span table provides the start and end points of the trapezoid scan lines that compose the block-row.

The start and end points of a trapezoid scan line may be determined from a geometric description of the trapezoid: the device coordinates of its top left vertex, $(x_L, y_L)$, the coordinates of its top right vertex $(x_R, y_L)$, the gradient along its left edge, $\Delta x_L$, the gradient along its right edge, $\Delta x_R$, and the height, h. After the first scan line's start and end points are computed, the start and end points for each next scan line are determined by adding the gradients to the start and end point x-coordinates of the previous scan line and by incrementing the y coordinates by 1.

The span table is used as a clipping path when processing and transferring ON-blocks. That is, only that part of a scan line defined by the span table is processed and transferred. No clipping is required for IN-blocks.

Figure 3A:
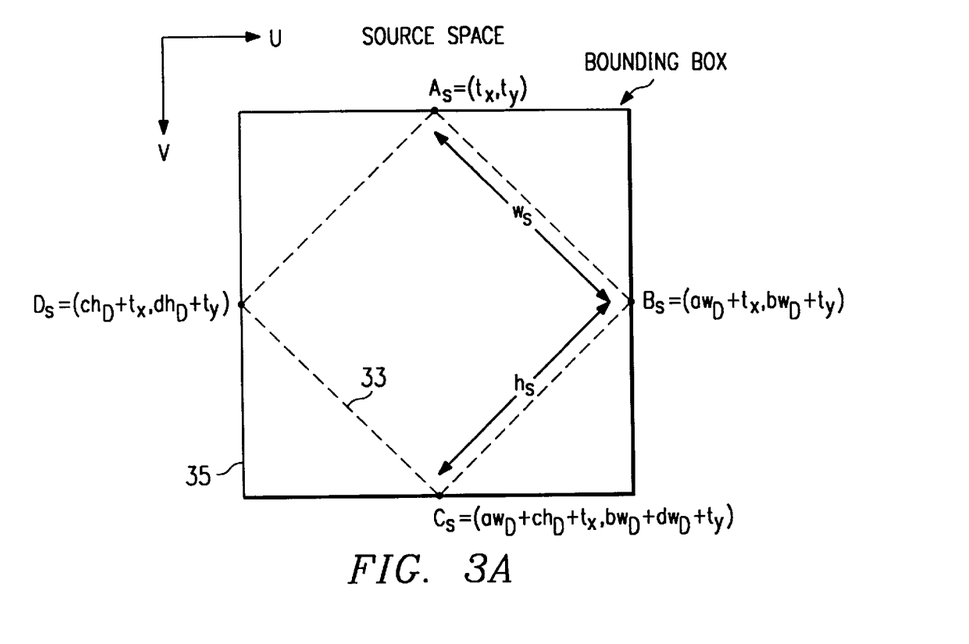
FIGS. 3A and 3B each illustrate a region in source space and destination space, respectively, as well as the dimensions of a destination block, the dimensions of a corresponding source block, and the dimensions of a bounding box containing the source block.
Figure 3B:
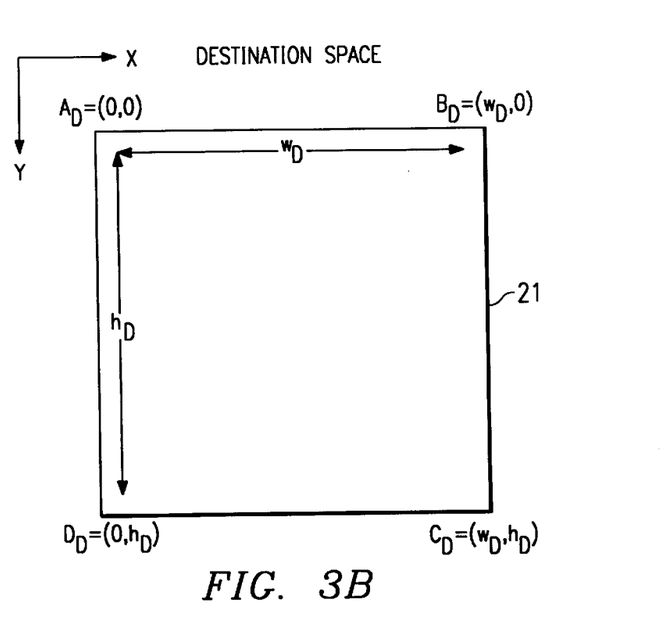

FIGS. 3A and 3B illustrate how a destination block 21, such as that of FIG. 2, is defined in destination space, and how a corresponding bounding box 35 is defined in the source space. The source space of FIG. 3A contains a portion of the source image. The destination space of FIG. 3B is to contain the transformed image. The values (u,v) represent the coordinates of any pixel in the source space. The values (x,y) represent the coordinates of the same pixel in the destination space.

A destination block, $A_D B_D C_D D_D$, in the destination space is rectangular and has dimensions $w_D \times h_D$. The four corners of this destination block 21, $A_D B_D C_D D_D$, map to four points in the source space, $A_S B_S C_S D_S$, which define a source block 33. This source block 33 is not necessarily rectangular and has dimensions $w_s \times h_s$. The source block 33 contains all of the source data required to create the image in the destination block 21. A bounding box 35 containing the source block 33 is to be fetched from external memory and cached in RAM 14 before rasterization of the corresponding destination block 21. This requires a description of the bounding box 35 in terms of its width and height, $W_{bbox}$ and $h_{bbox}$.

The bounding box dimensions can be expressed in terms of the dimensions of the destination block 21 and the transform coefficients. First, the width and height of the source block 33 are defined in terms of the width and height of the destination block 21, using the transform coefficients, a,b,c,d, as follows:

$$w_S = w_D \sqrt{a^2 + b^2}$$
$$h_S = h_D \sqrt{c^2 + d^2}$$

The vertices, $A_D B_D C_D D_D$, of the destination block 21 are expressed in terms of $W_D$ and $h_D$, relative to $A_D$. The vertices, $A_S B_S C_S D_S$, of the source block 33 are expressed in terms of $W_D$ and $h_D$ and the transform coefficients, a,b,c,d, relative to $A_S$. The width of the bounding box 35 is the difference between the largest and smallest u coordinates of $A_S B_S C_S D_S$. There are four cases, depending on the sign of a and b. However, in all cases, the bounding box width is $|aw_D|+|ch_D|$. That is, $$w_{bbox}=|aw_D|+|ch_D|.$$

Similarly, the height of the bounding box 35 is $$h_{bbox}=|bw_D|+|dh_D|.$$

The dimensions of the bounding box 35 can be calculated in a manner that minimizes the transfer cycles for transferring the bounding box data to cache memory. This calculation involves a "transfer cycles" value, which is defined as the number of clock cycles required for transfer controller 15 to service a packet request by a parallel processor 12. To compute a transfer cycles value, the characteristics of external memory (from which the packet is to be transferred) is considered. In the example of this description, the external memory is assumed to be SDRAM with no wait states, a page width of 4096 bytes, and a penalty (Row Address Strobe delay) of 5 cycles for switching pages. The source image is assumed to be less than 4096 pixels wide and the destination image is assumed to be more than 4096 pixels wide.

In the following transfer cycles equation, the width and height of the destination image are $W_D$ and $H_D$, respectively. The width and height of the source image are $W_S$ and $H_S$. The width and height of the destination block 21 are $W_D$ and $h_D$. The width and height of the source block 33 are $W_S$ and $h_S$. The width and height of the bounding box 35 are $W_{bbox}$ and $h_{bbox}$. The latency of the transfer controller 15 (the number of clock cycles required to set up a transfer) is 20 clocks. The number of transfer cycles, TC, is:

$$TC = \left\{\left(\frac{w_D h_D}{8} + 5 \cdot h_D + 20\right) \cdot \frac{W_D H_D}{w_D h_D}\right\} + \quad \text{Equa 1 (A)}$$
$$\left\{\left(\frac{w_{bbox} h_{bbox}}{8} + 5 \cdot \frac{W_s}{4096} \cdot h_{bbox} + 20\right) \cdot \frac{W_D H_D}{w_D h_D}\right\}$$

The transfer cycles value is minimized by minimizing the right hand side of Equation (1A). The minimization can be simplified because $W_D$ and $H_D$ are fixed and can be removed for purposes of minimization. Thus, a minimized transfer cycles value, TC', may be accomplished by minimizing the following expression:

$$TC' = \left(\frac{w_D h_D}{8} + 5h_D + 40 + \frac{(|aw_D|+|ch_D|)(|bw_D|+|dh_D|)}{8} + \right. \quad \text{Equa 1 (B)}$$
$$\left. 5 \cdot \frac{W_s}{4096} \cdot (|bw_D|+|dh_D|)\right) / w_D h_D$$

where the bounding box dimensions are expressed in terms of $w_D$ and $h_D$ and a,b,c,d.

A constraint on the bounding box dimensions is that the bounding box 35 must fit in a given memory size. In the example of this description, this memory size is the size of one 2 Kbyte data RAM 14. Thus, the bounding box size, S, is constrained to 2048 bytes. This bounding box constraint is expressed as:

$$S = w_{bbox} \times h_{bbox} \quad \text{Equa (2)}$$
$$= (|awd|+|chd|) \times (|bwd|+|dhd|)$$
$$0 = |cd|h_D^2 + (|ad|+|bc|)w_D h_D + |ab|w_D^2 - S$$
$$h_D = \frac{-(|ad|+|bc|)w_D + \sqrt{(|ad|-|bc|)^2 w_D^2 + 4|cd|S}}{2|cd|}$$

To obtain a positive value of $h_D$, the right hand side of Equation (2) must be greater than 0, which results in:

$$w_{Dmax} = \sqrt{\frac{S}{|ab|}} \quad \text{Equa (3)}$$

Thus, for a given cache size, S, and for a given transformation having coefficients, a,b,c,d, the maximum value of $W_D$ can be determined from the known values, S, a, and b.

A test set of values of $w_D$ and $h_D$ can be obtained by varying the value of $w_D$ between 8 (one data word) and $w_{Dmax}$ and calculating a corresponding $h_D$ from Equation (2). For each $w_D$ and $h_D$, a transfer cycles value from Equation (1A) or Equation (1B) is calculated, and the results are stored in a table. By referring to this table, a parallel processor 12 may determine the $w_D$ corresponding to the minimum transfer cycles value. The corresponding values $h_D$ and of $w_{bbox}$ and $h_{bbox}$ can then be calculated.

Figure 4:
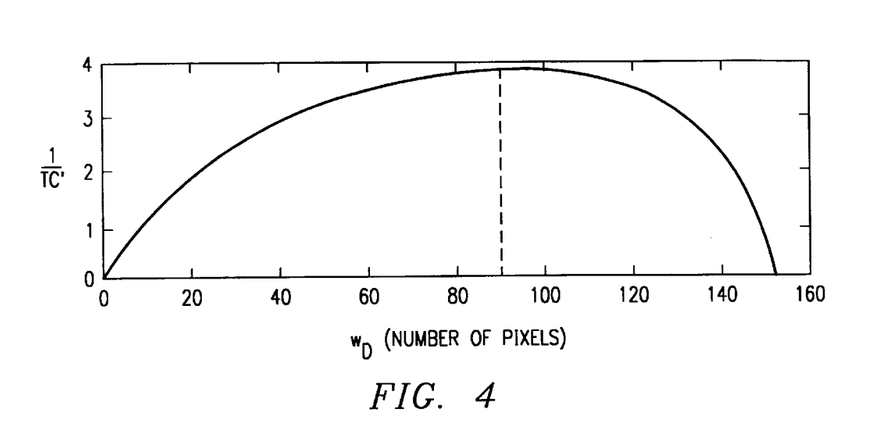
FIG. 4 illustrates how an optimum bounding box width may be determined by calculating transfer cycles values for various bounding box widths and heights.
Figure 5:
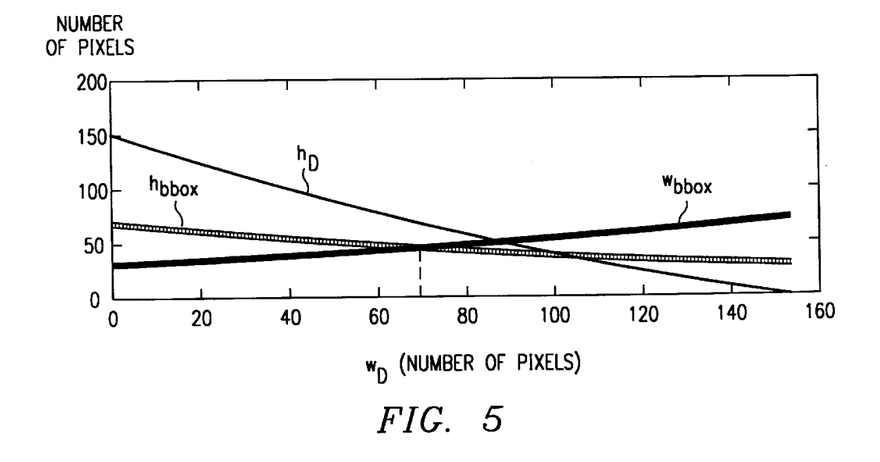
FIG. 5 illustrates how an optimum bounding box width and height may be determined heuristically.

FIG. 4 illustrates a plot of the inverse of minimized transfer cycles values, 1/TC', versus $W_D$. In this example, a source image is scaled by a factor of 2 and rotated 22.5 degrees. The transform coefficients were used to calculate transfer cycle values for varying values of $W_D$, using Equation (1B). The value of $w_d$ associated with the largest inverse transfer cycle value is the value that will provide the most efficient bounding box size. FIG. 5 illustrates values of $h_D$, $w_{bbox}$, and $h_{bbox}$, plotted as a function of $W_D$ for the same transformation as in FIG. 4.

The above-described approach for determining optimal dimensions of bounding box 35 is computationally expensive. As an alternative, a heuristic approach can be used. For the heuristic approach, $W_{bbox}$ is constrained to be equal to $h_{bbox}$. In other words, the bounding box 35 is required to be square. If $w_{bbox}=h_{bbox}$, then, $$|a|w_D+|c|h_D=|b|w_D+|d|h_D \qquad \text{Equa (4)}.$$

Further, if the bounding box 35 is to be cached in an area of size S, then, $$(|a|w_D+|c|h_D)^2=S,$$

and $$|a|w_D+|c|h_D=\sqrt{S} \qquad \text{Equa (5)}.$$

The values $w_D$ and $h_D$ can be determined by solving Equations (4) and (5). The bounding box dimensions, $w_{bbox}$ and $h_{bbox}$, may then be calculated from $w_D$, $h_D$, and a,b,c,d.

FIG. 5 can be used to compare heuristically derived bounding box dimensions to those derived by finding a minimal transfer cycles value. The intersection of the plots of $w_{bbox}$ and $h_{bbox}$ corresponds to the values at which the two dimensions are equal. These values would be the result of a heuristic determination. The corresponding value of $W_D$ is acceptably close to the value of $W_D$ derived from the minimization process illustrated in FIG. 4.

In the above-described calculations, the destination block dimensions, $w_D$ and $h_D$, were calculated, and then used to calculate the bounding box dimensions, $w_{bbox}$ and $h_{bbox}$. However, the calculations could be rewritten to calculate the bounding box dimensions directly. Thus, Equations (1B) and Equation (3) could be equivalently expressed in terms of the bounding box dimensions. The two approaches to calculating the bounding box dimensions are equivalent for purposes of the invention. Another equivalent approach would be the reversal of the roles of the destination block width and the destination block height.

Figure 6:
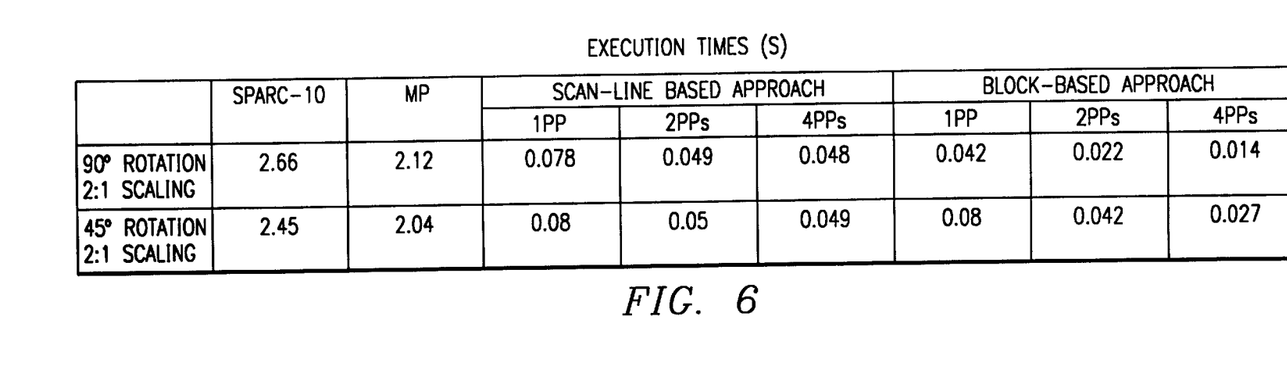
FIG. 6 sets out a comparison of scan-line caching (conventional) versus block caching (in accordance with the invention).

FIG. 6 sets out a comparison of execution times for two typical transformations. The first two columns of data compare execution times for scan-line based image transformation using a single processor. The first of these columns shows execution times using a SPARC-10 processor, specifically a SuperSparc model 41 with a 50 Mz TMS390Z55 SuperSparc CPU, 16 Kbytes internal cache, 1Mbyte external cache, and 179 Mbytes of memory. The second column shows execution times using the master processor 11 of multiprocessor 10, at 50 MHz with 4 Kbytes of internal cache and 128 Mbytes of memory.

The next three columns show the execution times for conventional scan-line data transfer using different numbers of parallel processors 12 of multiprocessor 10. In the scan-line approach, there is a minimal difference in execution time as the number of parallel processors 12 is increased. This is due to bottlenecks of transfer controller 15. The last three columns show the execution times for block transfers in accordance with the invention. There is significant improvement as the number of parallel processors 12 is increased, due to the reduction of bottlenecks. As shown, the block transfer approach is significantly faster than the scan-line approach.

Special Cases: Orthogonal Rotations

Orthogonal rotations lead to certain simplifications. Two special cases of orthogonal rotations can be identified. One is 90 or 270 degree rotation; the other is 0 or 180 degree rotation.

In the case of 90 or 270 degree rotation, a=d=0. Also, $$S=|bc|h_D w_D.$$

Equation 1(B) is simplified to:

$$TC' = \frac{1}{8} + \frac{5|bc|h_D}{S} + \frac{40|bc|}{S} + \frac{|bc|}{8} + 5\frac{W_S}{4096}\frac{b}{h_D}$$

The above expression is minimized when:

$$h_D = \sqrt{\frac{W_S \cdot S}{4096 \cdot |c|}}$$

$$w_D = \frac{1}{|b|}\sqrt{\frac{4096 \cdot S}{W_S \cdot |c|}}$$

Thus, in the case of 90 or 270 degree rotations, the optimal bounding box dimensions are easily calculated.

For 0 or 180 degree rotations, b=c=0. Also, $$S=|ad|h_D w_D.$$

Equation 1(B) is simplified to:

$$TC' = \frac{1}{8} + \frac{5}{w_D} + \frac{40|ad|}{S} + \frac{|ad|}{8} + 5\frac{W_s}{4096}\frac{d}{w_D}$$

The above expression is minimized when $w_D$ is maximized. Thus, $$h_D=1$$

and $$w_D=S/|ad|.$$

In the case of 0 or 180 degree rotations, transfer cycles can be further reduced because one source line typically maps to several destination lines. Typically, for printing applications, the scanned image is at a lower resolution than the printed image. For example, the scanned image might be at 300 dpi (dots per inch) whereas the printed image is at 600 dpi. Thus, an image expansion must occur during image transformation. The source line is fetched once, scaled by the appropriate scale factor, and copied into the frame buffer several times (once for each corresponding destination line). This approach uses significantly fewer transfer cycles than would fetching a source line for each destination line. Processing cycles are also reduced because a given source line is scaled only once and the result copied to all corresponding destination lines.

Figure 7:
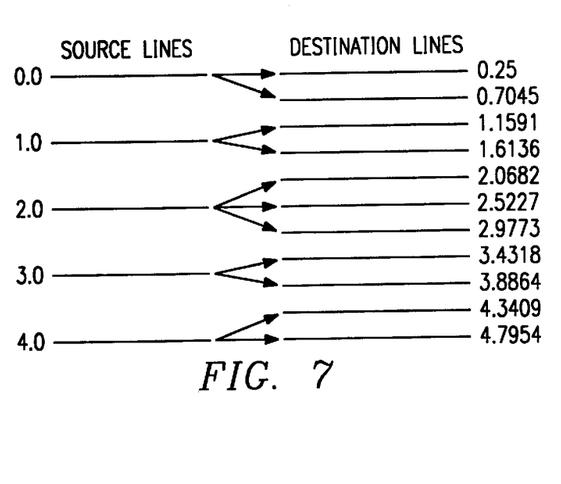
FIG. 7 illustrates the mapping of pixels in the y direction during rasterization for a 0 or 180 degree rotation.

FIG. 7 illustrates the mapping between source and destination lines for a scale factor of 2.2, for 0 or 180 degree rotations. For example, suppose the first destination line maps to a source line at a v-coordinate of 0.25. This destination line is mapped to line 0 of the source image, where the line number is obtained by truncating the v-coordinate. The v-coordinates of subsequent lines are determined by adding 1/2.2=0.4545 to the v-coordinates of the previous line. If the integer portion of the v-coordinate changes, then a new source line is fetched.

Figure 8:
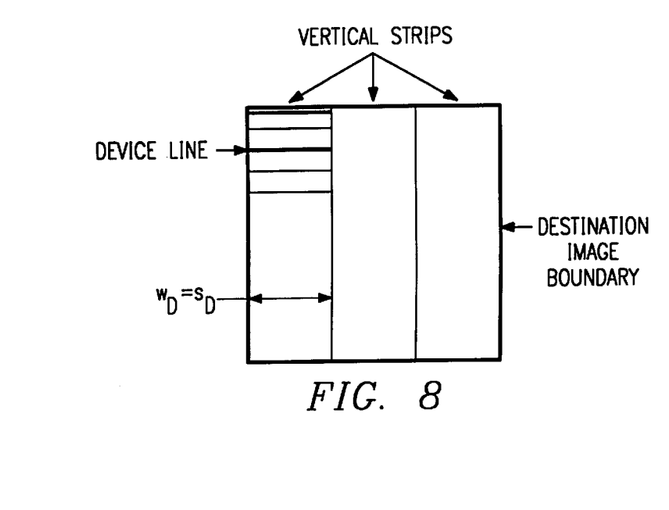
FIG. 8 illustrates the process of rasterizing a trapezoid for 0 or 180 degree rotation.

FIG. 8 illustrates how the destination image may be processed in strips. It is possible that the destination line width might exceed the size of an on-chip destination buffer. With the processing of FIG. 8, the destination lines in one strip are generated before processing the next strip.

Figure 9:
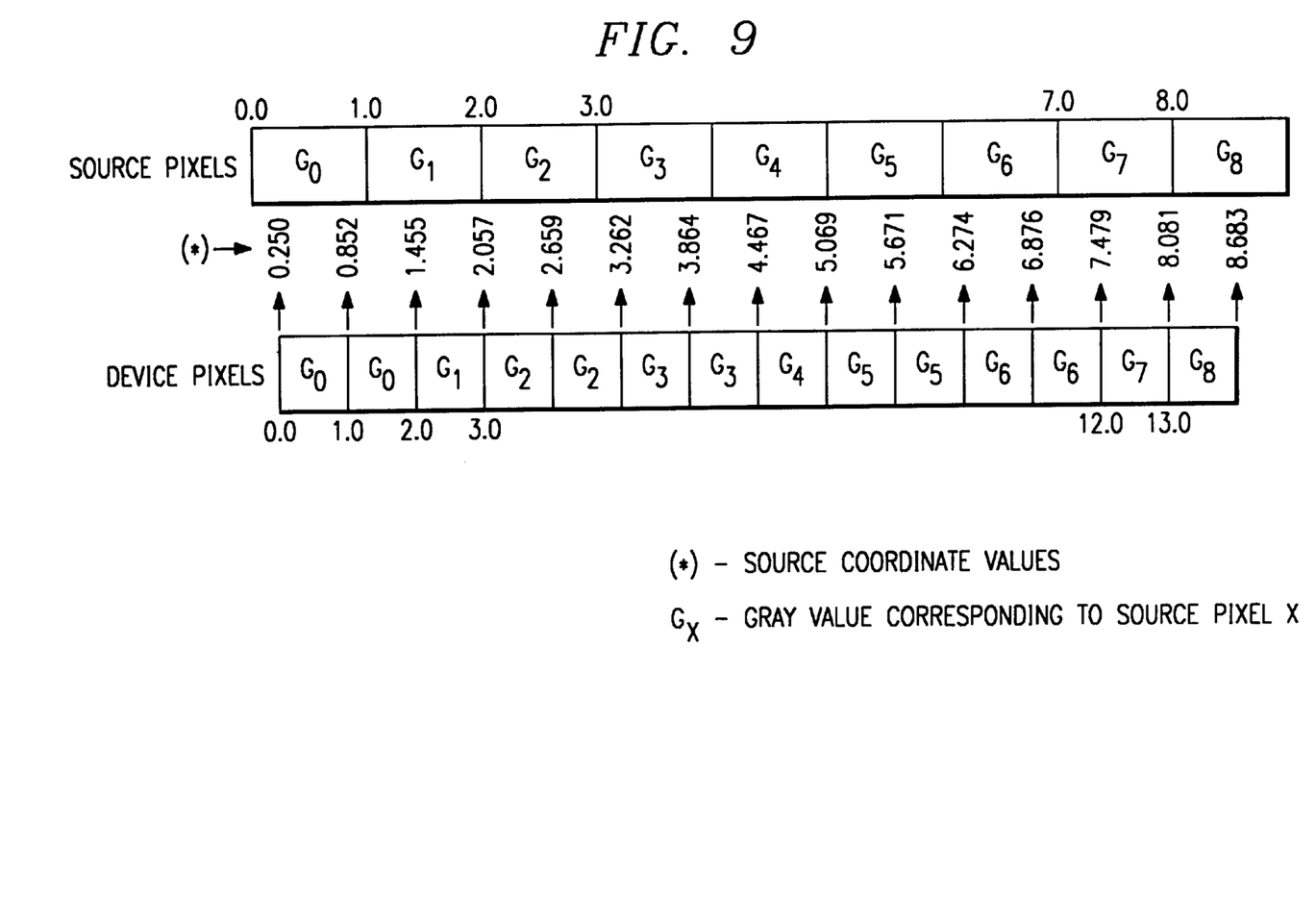
FIG. 9 illustrates the mapping of pixels in the x direction during rasterization for a 0 or 180 degree rotation.

FIG. 9 illustrates scaling in the horizontal direction in the case of 0 or 180 degree rotations. The source grey value is read from the source buffer once and is copied to the destination buffer multiple times, depending on the scale factor. This approach uses significantly fewer processing cycles as compared to the convention approach where there is one source buffer read for every destination buffer write. In FIG. 9, a given source line is mapped into destination space with a scale factor of 1.6. For example, a first destination pixel might map to a source pixel at u-coordinate 0.25. This destination pixel is mapped to source pixel 0. The pixel number is obtained by truncating the u-coordinate. The u-coordinates of subsequent pixels are determined by adding 1/1.6=0.6024 to the u-coordinates of the previous pixel. When the integer portion of the u-coordinate changes, then a new source pixel is fetched.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of caching source image data to be transformed to transformed image data for a 90 or 270 degree rotation, in accordance with transform coefficients by a multiprocessor system having a cache memory with a predetermined size, comprising the steps of:

providing a destination block and said cache memory with a predetermined size;

calculating the destination block width and destination block height of said destination block, said destination block to contain said transformed image data in destination space in said destination block, said step of calculating being performed by expressing said destination block width and said destination block height in terms of the width of the source image data, said transform coefficients, and said cache memory with predetermined size, thereby obtaining two equations, and by solving said two equations;

calculating said bounding box width and said bounding box height as functions of said destination block width, said destination block height, and said transform coefficients; and transferring said source image data contained within said bounding box to said cache memory;

calculating a transfer cycles value representing the number of transfer cycles required to transfer said data in said bounding box and being a function of said destination block width, said destination block height, said bounding box width, and said bounding box height;

repeating all of said steps prior to said transferring step to determine a minimum transfer cycles value, thereby determining optimum values of said bounding box width and said bounding box height.

2. A method of caching source image data to be transformed to transformed image data in accordance with transform coefficients by a multiprocessor system having a cache memory with a cache size, comprising the steps of:

calculating a destination block width and a destination block height of a destination block, said destination block to contain said transformed image data in destination space, said calculating being performed by selecting a value for said destination block width and using said value to calculate said destination block height from said cache size and said transformation coefficients;

calculating a bounding box width and a bounding box height of a bounding box containing said source image data, said bounding box width and said bounding box height being functions of destination block width, said destination block height, and said transform coefficients;

calculating a transfer cycles value representing the number of transfer cycles required to transfer said data in said bounding box and being a function of said destination block width, said destination block height, said bounding box width, and said bounding box height;

repeating all of said steps to determine a minimum transfer cycles value, thereby determining optimum values of said bounding box width and said bound box height; and then transferring said source image data contained within said bounding box to said cache memory.

3. The method of claim 2, further comprising the step of calculating a maximum value of said destination block width and wherein said repeating step is repeated for values of said destination block width less than said maximum.

4. A method of caching source image data to be transformed to transformed image data in accordance with transform coefficients by a multiprocessor system having a cache memory with a cache size, comprising the steps of:

calculating a destination block width and a destination block height of a destination block, said destination block to contain said transformed image data in destination space, said calculating being performed by selecting a value for said destination block width and using said value to calculate said destination block height from said cache size and said transformation coefficients;

calculating a bounding box width and a bounding box height of a bounding box containing said source image data, said bounding box width and said bounding box height being functions of destination block width, said destination block height, and said transform coefficients;

calculating a minimized transfer cycles value representing a minimization of the number of transfer cycles required to transfer said data in said bounding box and being a function of said destination block width, said destination block height, said bounding box width, and said bounding box height and said transform coefficients;

repeating all of said steps to determine a minimum value of said minimized transfer cycles value, thereby determining optimum values of said bounding box width and said bound box height; and then transferring said source image data contained within said bounding box to said cache memory.

5. The method of claim 4, further comprising the step of calculating a maximum value of said destination block width and wherein said repeating step is repeated for values of said destination block width less than said maximum.

6. The method of claim 2, wherein said multiprocessor system is a single integrated circuit device.

7. The method of claim 6, wherein said cache memory is part of said integrated circuit device.

8. The method of claim 2, wherein said method is performed by a subprocessor of said multiprocessor system.

9. The method of claim 2, wherein said method is concurrently performed in parallel by subprocessors of said multiprocessor system.

10. A method of caching source image data to be transformed to transformed image data in accordance with transform coefficients by a multiprocessor system having a cache memory with a predetermined size, comprising the steps of:

providing a destination block and said cache memory;

calculating the destination block width and destination block height of said destination block, said destination block to contain said transformed image data in destination space in said destination block, said step of calculating being performed by constraining a bounding box containing said source image to have a bounding box width and a bounding box height that are equal, by expressing said equality in terms of said destination block width and said destination block height and by equating said bounding box area to said cache memory with a predetermined size thereby obtaining two equations, and by solving said two equations;

calculating said bounding box width and said bounding box height as functions of said destination block width, said destination block height, and said transform coefficients;

transferring said source image data contained within said bounding box to said cache memory;

calculating a transfer cycles value representing the number of transfer cycles required to transfer said data in said bounding box and being a function of said destination block width, said destination block height, said bounding box width, and said bounding box height; and repeating all of said steps prior to said transferring step to determine a minimum transfer cycles value, thereby determining optimum values of said bounding box width and said bounding box height.

11. The method of claim 10, wherein said multiprocessor system is a single integrated circuit device.

12. The method of claim 11, wherein said cache memory is part of said integrated circuit device.

13. The method of claim 10, wherein said method is performed by a subprocessor of said multiprocessor system.

14. The method of claim 10, wherein said method is concurrently performed in parallel by subprocessors of said multiprocessor system.

15. A method of caching source image data to be transformed to transformed image data for a 0 to 180 degree rotation, in accordance with transform coefficients by a multiprocessor system having a cache memory with a predetermined size, comprising the steps of:

providing a destination block and said cache memory with a predetermined size;

calculating the destination block width and destination block height of said destination block, said destination block to contain said transformed image data in destination space in said destination block, said step of calculating being performed by setting said destination block height to one and expressing said destination block width in terms of said transform coefficients and said cache memory with a predetermined size;

calculating a bounding box width and a bounding box height as functions of said destination block width, said destination block height, and said transform coefficients; and transferring said source image data contained within said bounding box to said cache memory;

calculating a transfer cycles value representing the number of transfer cycles required to transfer said data in said bounding box and being a function of said destination block width, said destination block height, said bounding box width, and said bounding box height;

repeating all of said steps prior to said transferring step to determine a minimum transfer cycles value, thereby determining optimum values of said bounding box width and said bounding box height.

16. The method of claim 15, further comprising the step of caching one line of said source image data for multiple lines of said transformed image data.

17. The method of claim 15, further comprising the step of caching one pixel of said source image data for multiple pixels of said transformed image data.

* * * * *